US008902015B1

(12) United States Patent
Srinivasan, V et al.

(10) Patent No.: US 8,902,015 B1
(45) Date of Patent: Dec. 2, 2014

(54) RADIO FREQUENCY POWER LOAD AND ASSOCIATED METHOD

(75) Inventors: Karthik Srinivasan, V, Madison, AL (US); Todd M. Freestone, Madison, AL (US); William Herbert Sims, III, New Market, AL (US)

(73) Assignee: The United States of America as Represented by the Administrator of the National Aeronautics and Space Administration, Washington, DC (US)

( * ) Notice: Subject to any disclaimer, the term of this patent is extended or adjusted under 35 U.S.C. 154(b) by 440 days.

(21) Appl. No.: 13/299,930

(22) Filed: Nov. 18, 2011

(51) Int. Cl.
*H04B 1/04* (2006.01)
*H01P 1/26* (2006.01)

(52) U.S. Cl.
CPC .................................... *H01P 1/262* (2013.01)
USPC ........................................ 333/22 F; 455/120

(58) Field of Classification Search
USPC ........... 333/22 F, 22 R, 81 R, 81 B, 208, 209, 333/211, 234, 227; 455/120
See application file for complete search history.

(56) References Cited

U.S. PATENT DOCUMENTS

| | | | | |
|---|---|---|---|---|
| 3,678,749 | A | 7/1972 | Harper | |
| 4,724,400 | A | 2/1988 | Luettgenau | |
| 5,119,042 | A | 6/1992 | Crampton et al. | |
| 5,198,153 | A | 3/1993 | Angelopoulos et al. | |
| 5,204,637 | A | 4/1993 | Trinh | |
| 5,256,987 | A | 10/1993 | Kibayashi et al. | |
| 5,561,395 | A | 10/1996 | Melton et al. | |
| 5,793,253 | A | 8/1998 | Kumar et al. | |
| 5,831,479 | A | 11/1998 | Leffel et al. | |
| 5,867,060 | A | 2/1999 | Burkett, Jr. et al. | |
| 6,020,787 | A | 2/2000 | Kim et al. | |
| 6,037,840 | A | 3/2000 | Myer | |
| 6,242,735 | B1 | 6/2001 | Li et al. | |
| 6,331,356 | B1 | 12/2001 | Angelopoulos et al. | |
| 6,507,243 | B2 | 1/2003 | Harris et al. | |
| 6,600,142 | B2 | 7/2003 | Ryan et al. | |
| 6,646,504 | B2 | 11/2003 | Dittmer et al. | |
| 6,650,200 | B2 | 11/2003 | Culliton et al. | |
| 6,707,671 | B2 | 3/2004 | Yamashita et al. | |
| 6,887,339 | B1 | 5/2005 | Goodman et al. | |
| 6,914,226 | B2 | 7/2005 | Ottaway | |
| 6,982,613 | B2 | 1/2006 | Wu et al. | |
| 6,985,047 | B2 * | 1/2006 | Brown et al. | 333/81 B |
| 7,041,535 | B2 | 5/2006 | Yamashita et al. | |
| 7,831,225 | B2 * | 11/2010 | Sims et al. | 455/120 |
| 2002/0001627 | A1 | 1/2002 | Nerreter et al. | |
| 2003/0042977 | A1 | 3/2003 | Kanda | |
| 2003/0215373 | A1 | 11/2003 | Reyzelman et al. | |
| 2003/0218566 | A1 | 11/2003 | Feldle et al. | |
| 2006/0137613 | A1 | 6/2006 | Kasai | |

* cited by examiner

*Primary Examiner* — Stephen Jones
(74) *Attorney, Agent, or Firm* — Norton R. Townsley; James J. McGroary

(57) ABSTRACT

A radio frequency power load and associated method. A radio frequency power load apparatus may include a container with an ionized fluid therein. The apparatus may include one conductor immersed in a fluid and another conductor electrically connected to the container. A radio frequency transmission system may include a radio frequency transmitter, a radio frequency amplifier connected to the transmitter and a radio frequency power load apparatus connected to the amplifier. The apparatus may include a fluid having an ion source therein, one conductor immersed in a fluid, and another conductor electrically connected to the container. A method of dissipating power generated by a radio frequency transmission system may include constructing a waveguide with ionized fluid in a container and connecting the waveguide to an amplifier of the transmission system.

12 Claims, 5 Drawing Sheets

RADIO FREQUENCY POWER LOAD AND ASSOCIATED METHOD

ORIGIN OF THE INVENTION

This invention was made in part by employees of the United States Government and may be manufactured and used by or for the Government of the United States of America for Governmental purposes without the payment of royalties thereon or therefor.

BACKGROUND

The present disclosure relates generally to radio frequency (RF) transmission systems and, in an embodiment described herein, more particularly provides an RF power load and associated method.

Typical conventional radio frequency (RF) power loads are large and cumbersome for a given power level handling capability. Generally, RF power loads are made up of carbon piles that have a characteristic impedance of fifty ohms.

Very high power modules are water cooled (for cooling of the carbon piles) and are very large. Typical RF power loads are also very expensive and difficult to maintain.

Therefore, it can be seen that it would be quite desirable to provide an improved RF power load.

SUMMARY

In carrying out the principles of the present disclosure, in accordance with an embodiment thereof, a radio frequency power load and associated method are described below. An example of the power load is a waveguide with one conductor immersed in an ionized fluid, and with another conductor connected to a container which contains the fluid.

In one aspect, an RF power load apparatus is provided. The apparatus may include a container and a fluid having an ion source therein. The container may surround the fluid. One conductor may be immersed in the fluid and a second conductor may be electrically connected to the container. The fluid may be water, the ion source may be a salt, and the container may form a waveguide.

In another aspect, an RF transmission system is provided which may include an RF transmitter and an RF amplifier connected to the transmitter. An RF power load apparatus may be connected to the amplifier. The apparatus may include an ionized fluid surrounded by a container. A conductor may be immersed in the fluid and another conductor may be electrically connected to the container. Both conductors may be electrically connected to the fluid.

In yet another aspect of the invention, a method of dissipating power generated by an RF transmission system is provided. The method may include constructing a waveguide of an RF power load apparatus. The waveguide may include an ionized fluid in a container. The method may also include immersing a conductor in the fluid, connecting another conductor to the container, connecting both conductors to an amplifier of the transmission system, and then converting RF power into heat in the fluid.

These and other features, advantages and benefits will become apparent to one of ordinary skill in the art upon careful consideration of the detailed description of representative examples below and the accompanying drawings, in which similar elements are indicated in the various figures using the same reference numbers.

DETAILED DESCRIPTION

It is to be understood that embodiments are described below merely as examples of useful applications of the principles of this disclosure, which is not limited to any specific details of these embodiments.

Figure 1:
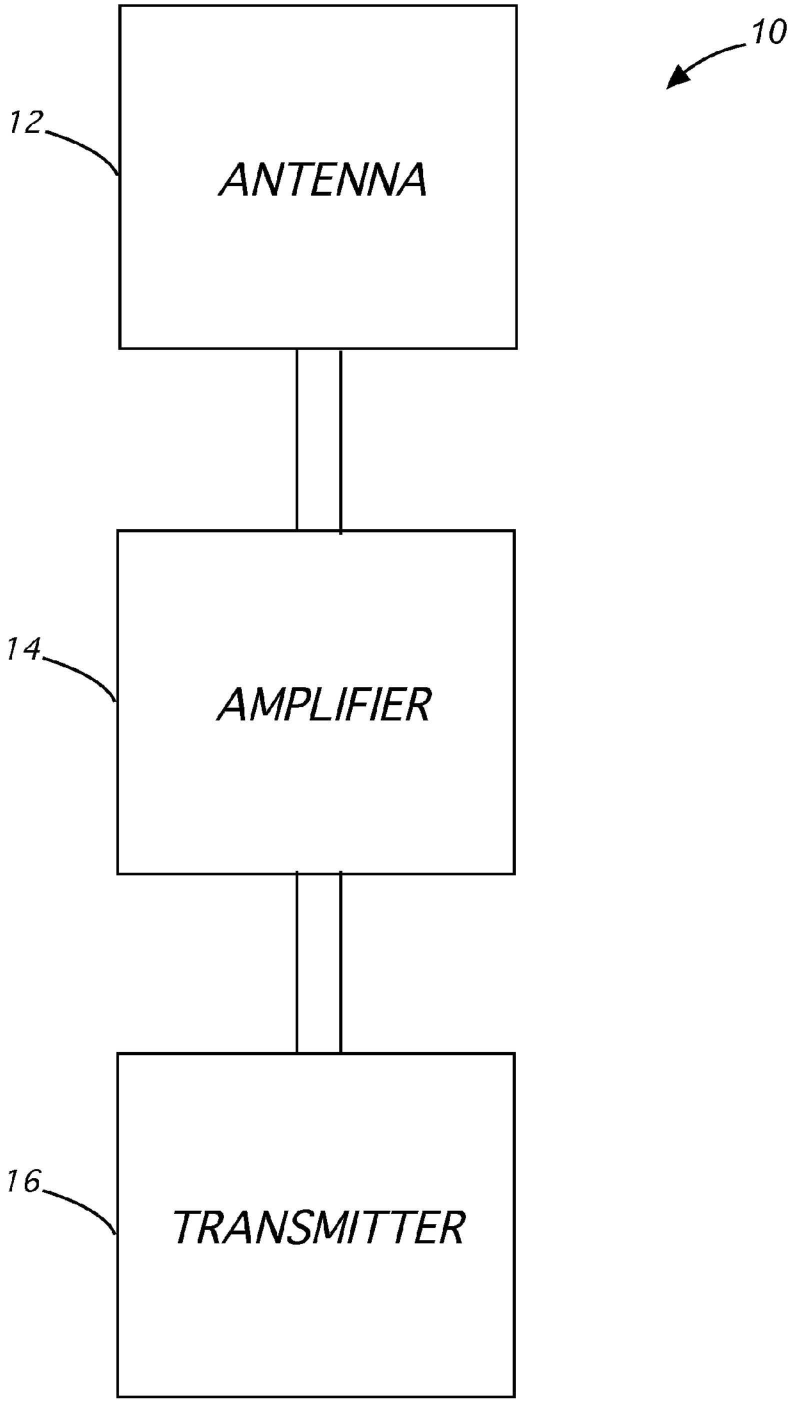
FIG. 1 is a representative view of an RF transmission system which can benefit from the principles of this disclosure.

Referring initially to FIG. 1, an RF transmission system 10 is representatively illustrated. In the system 10, a transmitter 16 is connected to an amplifier 14, which is connected to an antenna 12. Although the system 10 is depicted as being used for RF transmission, it will be appreciated that the system could include a receiver, in which case the transmitter 16 could instead be a transceiver, if desired.

Figure 2:
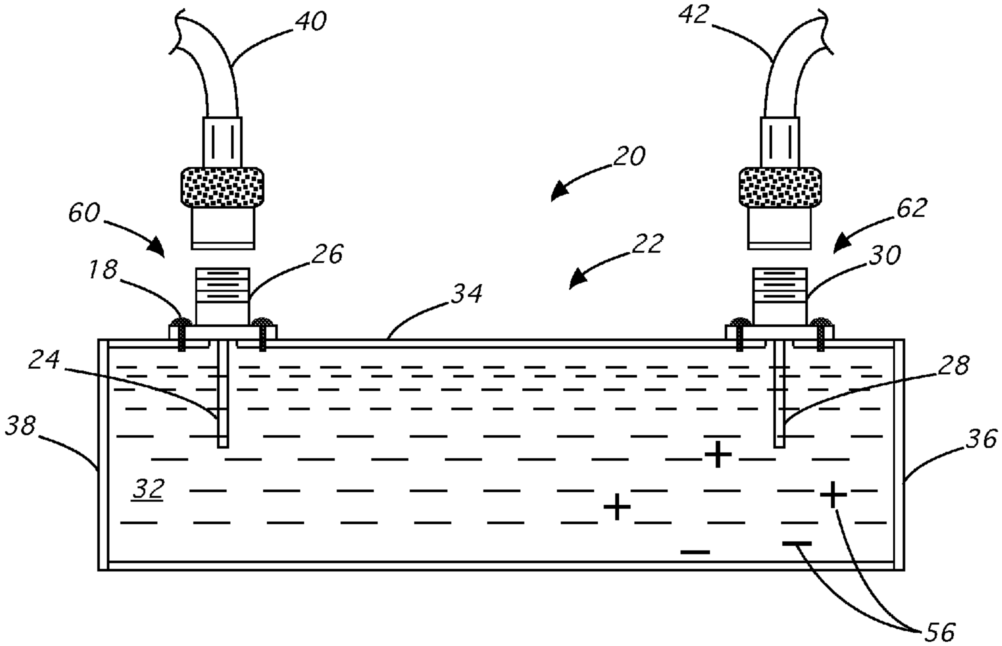
FIG. 2 is a representative side view of an RF power load apparatus that may be used with the system of FIG. 1.

Referring additionally now to FIG. 2, an RF power load apparatus 20 for use with the RF transmission system 10 of FIG. 1 is representatively illustrated. Of course, the apparatus 20 could be used with other types of RF transmission systems, if desired.

As depicted in FIG. 2, the apparatus 20 includes an input connector 60 used to releasably connect a coax (coaxial cable) 40 to the apparatus. However, it is not required for a coax 40 or connector 60 to be used. Any cable suitable for transmission of RF signals may be connected directly to the apparatus 20 by a different connector, soldering, clamps, etc. in keeping with the principles of this disclosure.

The input connector 60 may be used to receive the RF signals from the RF transmitter 16. The connector 60 includes two conductors 24, 26 that receive RF power from the transmitter 16 and transfer the RF power into a waveguide 22 of the apparatus 20. Conductor 24 is immersed in a fluid 32 contained in a container 34 and is in electrical contact with the fluid 32. Conductor 26 is shown electrically connected to the container 34 and secured via screws 18. However, it is not necessary for the connector 60 to be secured to the container using screws 18. For example, the connector 60 may be soldered, clamped, etc. to the container.

The fluid 32 contained within the container 34 may be an ionized liquid that provides certain electrical impedance between the container and the conductor 24. The size (e.g. length, shape, thickness, etc.), material composition, and position of the conductors 24, 28 may be adjusted or "tuned" for a selected frequency. Also, the position of the conductor 24 in a wall of the container 34 effects the tuning of the waveguide 22 for a selected frequency.

Figure 4:
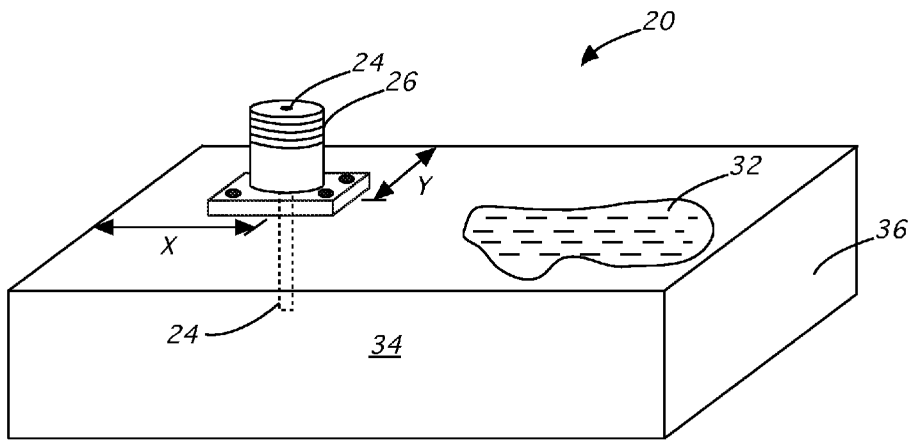
FIG. 4 is a representative perspective view of another configuration of the RF power load apparatus.

FIG. 4 shows coordinates X and Y as being distances from edges of the container 34. The coordinates X, Y generally determine the position of the conductors 24, 26 in the waveguide 22. The coordinates X, Y can be varied to change the position of the conductors 24, 26 thereby tuning the waveguide 22 for a selected frequency.

The size (e.g. length, shape, thickness, etc.) and material composition of the container 34 can also be varied so as to "tune" the waveguide 22 for a selected frequency. Additionally, a composition of fluids 32, 50 may be a mixture of various materials and/or fluids and the mixture may be "tuned" for a selected frequency.

The fluids 32, 50 are preferably entirely, or mostly, water. Thus, this component of the apparatus 20 is readily available and inexpensive. The ion source 56 in the fluids 32, 50 is preferably a salt (such as NaCl), which is also readily available and inexpensive.

However, it should be understood that other types of fluids and ion sources, and combinations thereof, may be used in keeping with the principles of the disclosure. For example, a gel could be used for the fluids 32, 50, etc.

The container 34 is preferably made of a conductive material, such as aluminum. The conductors 24, 26 are preferably metal.

When the RF power is transmitted through the conductors 24, 26, the fluid 30 provides impedance between the conductors and, as a result, the RF power is dissipated into the fluid as heat. Due to the mass of the fluid 30, temperature increase in the fluid is not instantaneous.

Thus, the RF power is dissipated in a controlled, safe and reliable manner. The quantity of the fluid 30 and the mixture of components therein may be conveniently adjusted to produce a desired impedance and heat absorbing mass to dissipate virtually any expected level of RF power. Hundreds of kilowatts of RF power can easily be dissipated using the apparatus 20.

An output connector 62 may be used to releasably connect a coax (coaxial cable) 42 to the apparatus 20. This output connector 62 may be used to output RF signals received from the RF transmitter and transferred through the apparatus to the output connector 62. However, it is not required for a coax 42 or a connector 62 to be used. Any cable suitable for transmission of RF signals may be connected directly to the apparatus 20 by a different connector, soldering, clamps, etc. in keeping with the principles of this disclosure.

The connector 62 includes two conductors 28, 30 that outputs RF power (e.g. signals) from the waveguide 22 of the apparatus 20. Conductor 28 is immersed in the fluid 32 and is in electrical contact with the fluid. Conductor 30 is shown connected to the container 34 via screws 18. Other attachments means may also be used to secure conductor 30 to the container 34.

Connector 62 allows the apparatus to be used as an RF frequency attenuator. When used as an attenuator, the waveguide 22 of the apparatus 20 behaves like a high-pass filter. All frequencies below a cut-off frequency are attenuated while all frequencies above the cut-off frequency are propagated through the waveguide 22 and output from the connector 62 into coax 42.

The output connector 62 may also be used as an RF sampler port for determining the RF power being received by the input connector 60 or for determining the amount of RF power dissipated as heat in the fluid 32. To determine the RF power received at the input connector 60, RF power measurements may be taken at the output connector 62 and, based on the known characteristics of the apparatus 20, the RF power at the input connector 60 can be determined.

Alternatively (or in addition), if the RF power at the connector 60 is known, then the amount of RF power dissipated into the fluid 32 as heat can be determined by measuring the RF power at the output connector 62 and calculating the difference between the two RF power values.

In one example of the apparatus 20, the apparatus includes a rectangular tube shaped container 34 made of aluminum. The inner dimensions of the container 34 are 9.75 cm×3.81 cm×60 cm. The ends of the container 34 are closed with aluminum end plates 36, 38. A hole, 0.75 cm in diameter, is drilled in the wall of the rectangular tube shaped container 34, close to one of the ends 36, 38 of the container 34.

Adjusting the coordinates X, Y (see FIG. 4) optimizes a location of the hole and provides an impedance match to ensure maximum RF power transfer between the RF transmitter 16 and the apparatus 20. A type-N Radio Frequency (RF) connector may be used as the interface between the apparatus 20 and the RF transmitter 16. A cylindrical conductor 24 can be attached to a center conductor of the type-N connector and inserted into the container through the hole. However, it is not required that a type-N RF connector be used. Any other suitable connector may be used in keeping with the principles of the current disclosure.

This conductor 24 is used to transfer the RF signals from the RF transmitter 16 to the apparatus 20. The length of the probe is adjusted to provide the widest frequency bandwidth achievable. It can be readily seen that altering the size of the conductor 24 may alter the frequency bandwidth of the apparatus 20.

For this example, the interior of the container 34 is filled with de-ionized water. An ion source is added to the water by dissolving a small amount of table salt (approximately 0.22 g) in the water. The resulting fluid 32 (e.g. salt water) is used to dissipate the RF energy that is transferred to the apparatus 20.

For this example, 1.5 kilowatts of RF power may be continuously dissipated by the apparatus 20 while maintaining the fluid 32 at a steady operating temperature of 40 degrees Celsius. This equates to at least 0.67 watts per cubic centimeter.

However, it can readily be seen that there are several ways to increase (or decrease) the amount of heat dissipation in keeping with the principles of this disclosure. For example, increasing the operating temperature allows the heat dissipation of the apparatus 20 to be increased. Additionally, an anti-freeze liquid may be added to the fluid 32 to increase the operating temperature of the apparatus 20.

Figure 3:
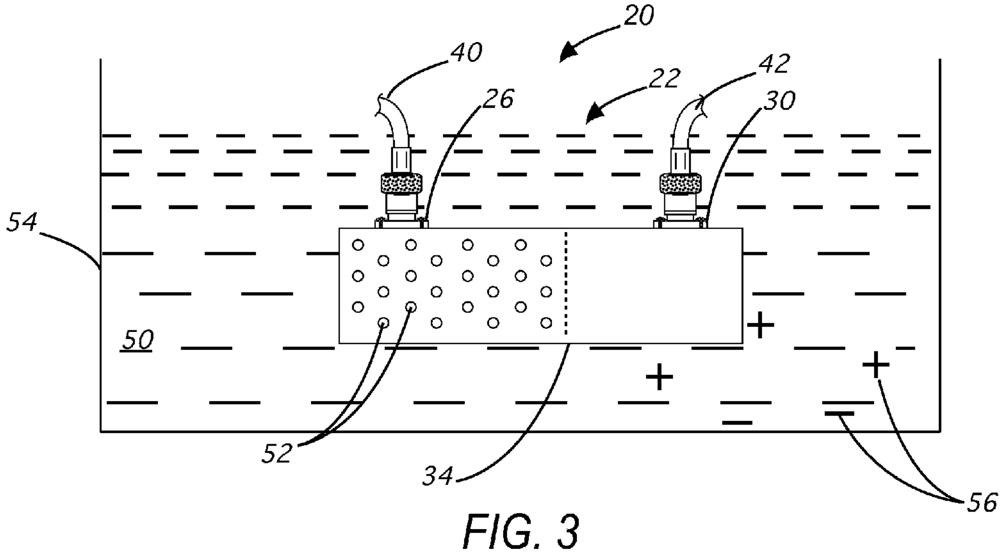
FIG. 3 is a representative side view of the RF power load apparatus immersed in a container of fluid.

Immersing the apparatus 20 in another fluid 50 as shown in FIG. 3 allows the heat dissipation of the apparatus 20 to be greatly increased. Additionally, perforations 52 may be added to the container 34, as seen in FIG. 3. The perforations 52 allow fluid communication between the fluids 32, 50 which significantly increases the RF power dissipating capability of the apparatus.

Referring now to FIGS. 5-10, various examples of the apparatus 20 are shown. These examples illustrate different numbers of RF connectors and different positions of these connectors. In addition, the ionization of the fluids 32, 50 may be adjusted to make the fluids more (or less) conductive.

If perforations 52 are not provided in the container 34, then the fluid 50 may be any fluid beneficial for removing the heat generated by the apparatus 20. The fluid 50 would not need to be an electrically conductive fluid. For example, the fluid 50 could be de-ionized water without an ion source added, an electrically insulating stable fluorocarbon-based fluid (such as FLOURINERT made by the 3M Corporation), etc.

If perforations 52 are provided in the container 34, then the fluid 50 would preferably have the same characteristics as the fluid 32 in order to keep the frequency performance of the apparatus 20 constant. However, is not required for the frequency performance of the apparatus to be constant. The fluid 50 may have different characteristics than the fluid 32 which would cause varying frequency performance of the apparatus as the fluids mingle together.

It can be readily seen that many more configurations of these elements as well as additional elements are possible in constructing an apparatus 20 in keeping with the principles of this disclosure.

Figure 5:
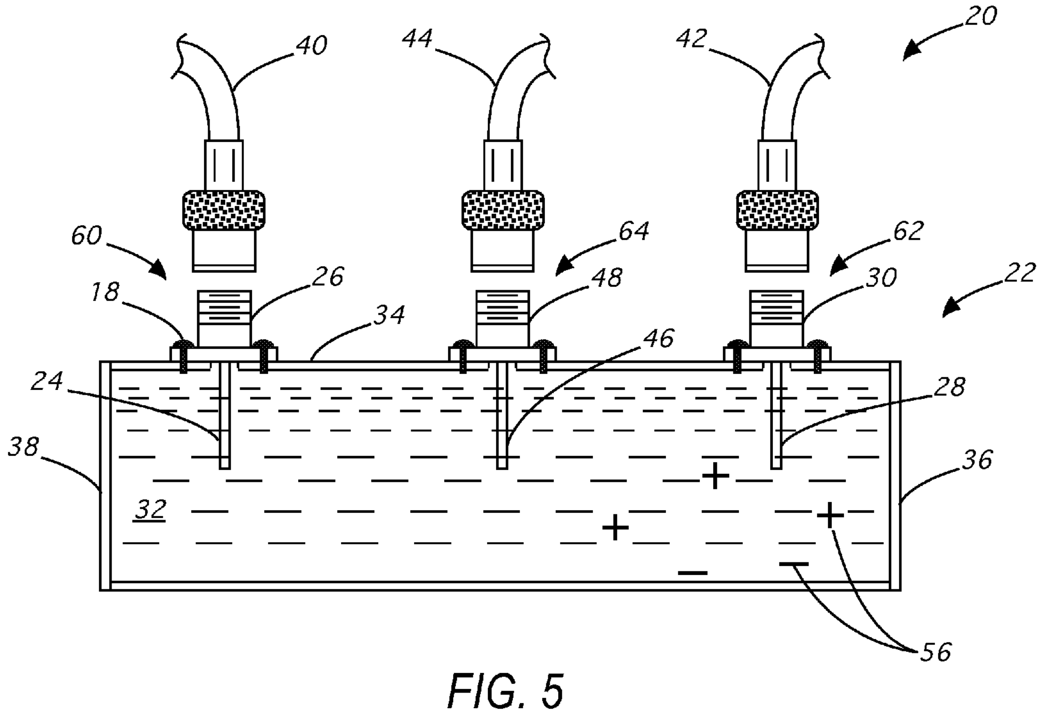
FIG. 5 is a representative side view of the RF power load apparatus with one RF input and two RF outputs.

Referring now to FIG. 5, another output connector 64 may be used to releasably connect a coax (coaxial cable) 44 to the apparatus 20. This output connector 64 may be used to output RF signals received from the RF transmitter and transferred through the apparatus to the output connector 64. However, it is not required for a coax 44 or a connector 64 to be used. Any cable suitable for transmission of RF signals may be connected directly to the apparatus 20 by a different connector, soldering, clamps, etc. in keeping with the principles of this disclosure.

The connector 64 includes two conductors 46, 48 that outputs RF power (e.g. signals) from the waveguide 22 of the apparatus 20. Conductor 46 is immersed in the fluid 32 and is in electrical contact with the fluid. Conductor 48 is shown connected to the container 34 via screws 18. Other attachments means may also be used to secure conductor 48 to the container 34.

The fluid 32 contained within the container 34 may provide an electrical impedance between the container and the conductor 46. The size (e.g. length, shape, thickness, etc.), material composition, and position of the conductors 46, 48 may be adjusted or "tuned" for a selected radio frequency. Also, the position of the conductor 46 in a wall of the container 34 effects the tuning of the waveguide 22 for a selected radio frequency.

Connector 64 allows the apparatus to be used as an RF attenuator with a second output path. Alternatively, (or in addition to) the output connector 62 may preferably be used as an RF sampler port for determining the RF power being received by the input connector 60 or for determining the amount of RF power dissipated as heat in the fluid 32.

To determine the RF power received at the input connector 60, RF power measurements may be taken at the output connector 64 and, based on the known characteristics of the apparatus 20, the RF power at the input connector 60 can be determined.

Additionally, to determine the RF power received at the output connector 62, RF power measurements may be taken at the output connector 64 and, based on the known characteristics of the apparatus 20, the RF power at the output connector 62 can be determined.

Alternatively (or in addition), if the RF power at the connector 60 is known, then the amount of RF power dissipated into the fluid 32 as heat can be determined by measuring the RF power at the output connector 64, determining the RF power at the output connector 62, and calculating the difference between the RF power values a connectors 60 and 62.

It is not required that connector 64 be positioned between connectors 60, 62, as shown in FIG. 5. It may be positioned anywhere on the container 34 in keeping with the principles of this disclosure.

Figure 6:
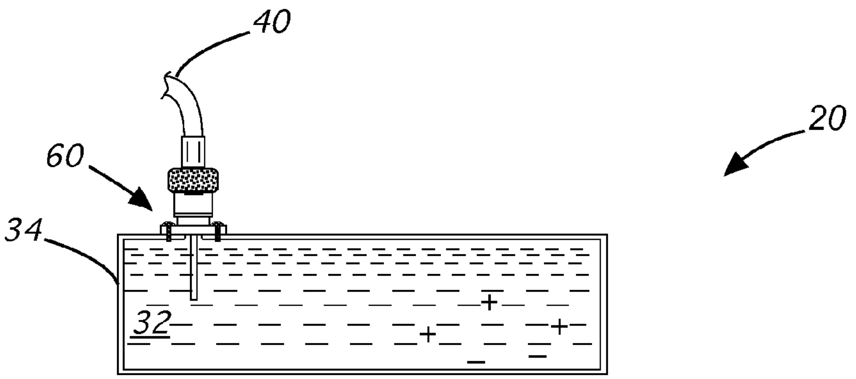
FIG. 6 is a representative side view of the RF power load apparatus with one RF input and no RF outputs.

Referring now to FIG. 6, the apparatus 20 includes a container 34 filled with fluid 32 and an RF connector 60 attached to a coax cable 40. RF power is input to the apparatus 20 through the connector 60 and the apparatus 20 is used to dissipate all of the RF power as heat in the fluid 32. This is typically referred to as 1-port dead-end RF power load (e.g. power dissipater).

Figure 7:
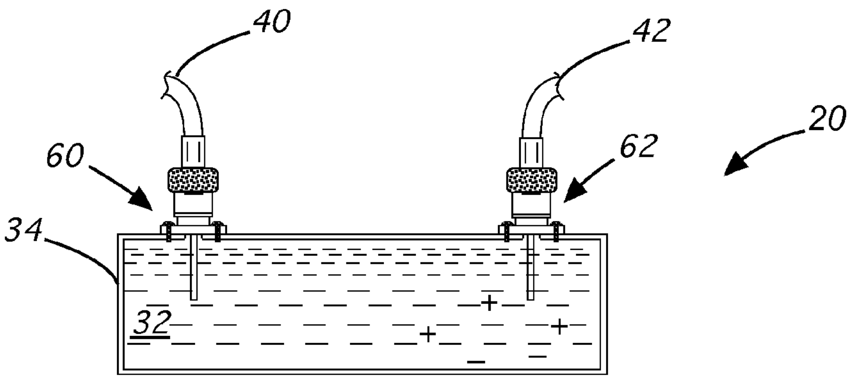
FIG. 7 is a representative side view of the RF power load apparatus with one RF input and one RF output.

Referring now to FIG. 7, the apparatus 20 is similar to the apparatus of FIG. 6, except that it includes a second connector 62 attached to a second coax 42. RF Power is received by the input connector 60, transmitted through the waveguide 22, attenuated by the waveguide, and output to the coax 42. A portion of RF power is dissipated as heat into the fluid 32. This is typically referred to as a 2-port pass-through power attenuator.

Figure 8:
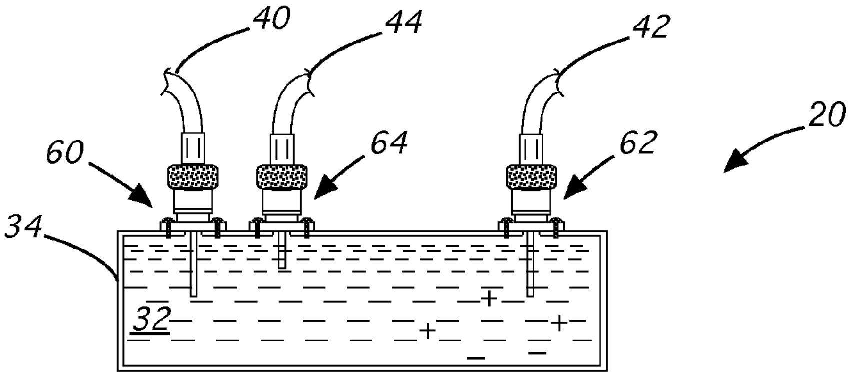
FIG. 8 is a representative side view of the RF power load apparatus with one RF input and two RF outputs with one RF output used as an RF sampler port.

Referring now to FIG. 8, the apparatus 20 is similar to the apparatus of FIG. 7, except that it includes a third connector 64 attached to a third coax 44. In this example, the connector 64 is used as a −30 dB RF sampler port and allows the RF power at connectors 60, 62, and the RF power dissipated as heat into the fluid 32 to be determined.

Notice that the conductor 46 of connector 64 is shown to be a different size to the one shown in FIG. 5. This illustrates that the conductors of connectors 60, 62, 64 may be adjusted to "tune" the RF frequency performance of the apparatus 20. Also, it is not required that the connector 64 to be a −30 dB connector to be an RF sampler port. Any other attenuation values for connector 64 may be provided in keeping with the principles of this disclosure.

In this example, the fluid 32 is highly conductive and minimizes any RF power attenuation attributed to the fluid. The apparatus 20 of FIG. 8 is typically referred to as a 2-port attenuator with RF sampler port.

Figure 9:
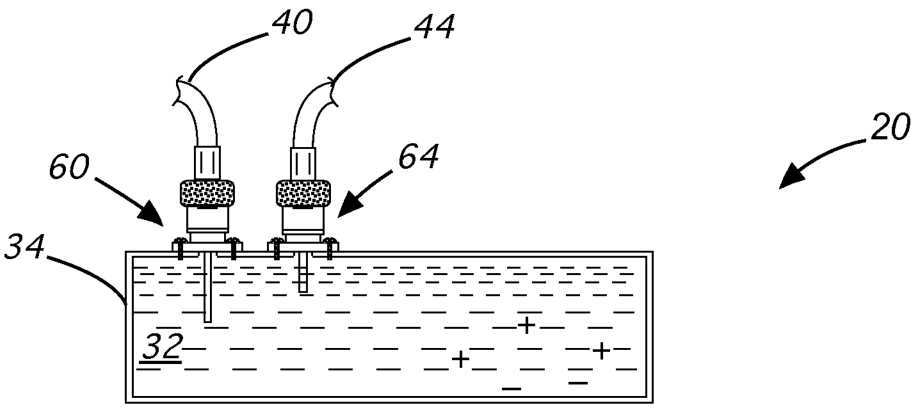
FIG. 9 is a representative side view of the RF power load apparatus with one RF input and an RF sampler port.

Referring to FIG. 9, the apparatus 20 is similar to the apparatus of FIG. 6, except that it includes a coax 44 connected to connector 64 where the connector 64 is used as an RF sampler port. This is typically referred to as 1-port dead-end RF power load with RF sampler port.

Figure 10:
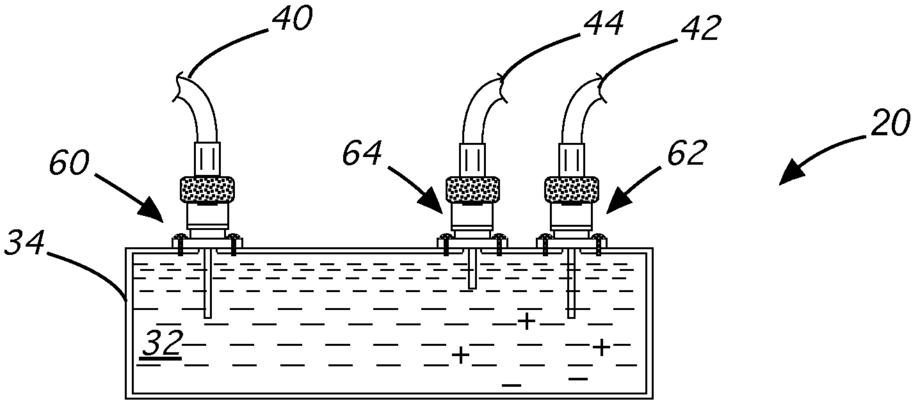
FIG. 10 is a representative side view of the RF power load apparatus with one RF input and two RF outputs with one RF output used as an RF sampler port and positioned differently than in FIG. 8.

Referring now to FIG. 10, the apparatus 20 is similar to the apparatus of FIG. 8, except that the connector 64 is positioned proximate the connector 62, instead of connector 60. This illustrates that the position of these connectors may be adjusted as desired to address a particular implementation in keeping with the principles of this disclosure.

It should be readily understood that the principles of this disclosure can be utilized with other frequencies as well and is not limited to only radio frequencies.

Therefore, through these and other examples of the apparatus 20, a cost-effective power load can dissipate hundreds of kilowatts of radio frequency (or other frequencies) power in a safe and efficient manner. The variations of the apparatus 20 given above can be implemented separately or in combination to achieve a desired size, weight, and performance of the apparatus 20.

Of course, a person skilled in the art would, upon careful consideration of the above description of representative embodiments, readily appreciate that many modifications, additions, substitutions, deletions, and other changes may be made to these specific embodiments, and such changes are within the scope of the principles of this disclosure. Accordingly, the foregoing detailed description is to be clearly understood as being given by way of illustration and example only, the spirit and scope of the present invention being limited solely by the appended claims and their equivalents.

What is claimed is:

1. A radio frequency power load apparatus, comprising:

a container;

a first fluid having an ion source therein, the first fluid being surrounded by the container;

a first conductor immersed in the first fluid;

a second conductor electrically connected to the container; and the first and second conductors electrically connected to the first fluid;

wherein the apparatus is adjusted to a selected frequency by adjusting any one of a size, a material composition, and a position of the first conductor.

2. A radio frequency power load apparatus, comprising:

a container;

a first fluid having an ion source therein, the first fluid being surrounded by the container;

a first conductor immersed in the first fluid;

a second conductor electrically connected to the container; and the first and second conductors electrically connected to the first fluid;

wherein the apparatus is adjusted to a selected frequency by adjusting any one of a size and a material composition of the container.

3. A radio frequency power load apparatus, comprising:

a container;

a first fluid having an ion source therein, the first fluid being surrounded by the container;

a first conductor immersed in the first fluid;

a second conductor electrically connected to the container; and the first and second conductors electrically connected to the first fluid;

wherein greater than 0.4 watts of radio frequency power is dissipated as heat into the first fluid per each cubic centimeter of volume of the apparatus.

4. A radio frequency power load apparatus, comprising:

a container;

a first fluid having an ion source therein, the first fluid being surrounded by the container;

a first conductor immersed in the first fluid;

a second conductor electrically connected to the container; and the first and second conductors electrically connected to the first fluid;

wherein the container is immersed in a second fluid.

5. The apparatus of claim 4, wherein the container is perforated, the second fluid contains an ion source, and the second fluid is in fluid communication with the first fluid.

6. A radio frequency power load apparatus, comprising:

a container;

a first fluid having an ion source therein, the first fluid being surrounded by the container;

a first conductor immersed in the first fluid;

a second conductor electrically connected to the container; and the first and second conductors electrically connected to the first fluid;

a third conductor;

and a fourth conductor;

wherein the third conductor is immersed in the first fluid and the fourth conductor is electrically connected to the container, and wherein a first amount of radio frequency power is transmitted from the first and second conductors, through a waveguide formed by the container, and to the third and fourth conductors.

7. The apparatus of claim 6, wherein a second amount of radio frequency power at the first and second conductors is determined by measurements at the third and fourth conductors.

8. The apparatus of claim 7, wherein a third amount of radio frequency power is determined by calculating a difference between the first and second amounts of radio frequency power, wherein the third amount of radio frequency power is dissipated as heat in the fluid.

9. The apparatus of claim 6, further comprising fifth and sixth conductors, wherein the fifth conductor is immersed in the first fluid and the sixth conductor is electrically connected to the container, and wherein a second amount of radio frequency power is transmitted from the first and second conductors, through the waveguide formed by the container, and to the fifth and sixth conductors.

10. The system of claim 9, wherein the apparatus is adjusted to a selected frequency by adjusting any one of a size, a material composition, and a position of the fifth conductor.

11. The apparatus of claim 9, wherein a third amount of radio frequency power at the fifth and sixth conductors is determined by measurements at the third and fourth conductors.

12. The apparatus of claim 11, wherein a fourth amount of radio frequency power is determined by calculating a difference between the second and third amounts of radio frequency power, wherein the fourth amount of radio frequency power is dissipated as heat in the fluid.

* * * * *